United States Patent
Kadotani

(10) Patent No.: US 12,498,627 B2
(45) Date of Patent: Dec. 16, 2025

(54) LIGHT SOURCE APPARATUS AND PROJECTOR

(71) Applicant: SEIKO EPSON CORPORATION, Tokyo (JP)

(72) Inventor: Norikazu Kadotani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 420 days.

(21) Appl. No.: 18/159,171

(22) Filed: Jan. 25, 2023

(65) Prior Publication Data

US 2023/0236487 A1    Jul. 27, 2023

(30) Foreign Application Priority Data

Jan. 25, 2022  (JP) .................. 2022-009395

(51) Int. Cl.
| | |
|---|---|
| G03B 21/16 | (2006.01) |
| G02B 27/14 | (2006.01) |
| G03B 21/00 | (2006.01) |
| G03B 21/20 | (2006.01) |

(52) U.S. Cl.
CPC .......... *G03B 21/16* (2013.01); *G03B 21/005* (2013.01); *G03B 21/2013* (2013.01); *G02B 27/141* (2013.01); *G02B 2207/117* (2013.01)

(58) Field of Classification Search
CPC ... G03B 21/16; G03B 21/005; G03B 21/2013
USPC .......................................... 353/52
See application file for complete search history.

(56) References Cited

U.S. PATENT DOCUMENTS

| | | |
|---|---|---|
| 2008/0169742 A1 | 7/2008 | Lai |
| 2010/0118280 A1* | 5/2010 | Chen ............... G03B 21/16 |
| | | 362/231 |
| 2010/0265709 A1* | 10/2010 | Liu .................. F21K 9/00 |
| | | 362/249.02 |
| 2012/0217519 A1 | 8/2012 | Xu et al. |
| 2013/0269913 A1 | 10/2013 | Ueda et al. |
| 2015/0042961 A1 | 2/2015 | Miyamae et al. |
| 2019/0227415 A1 | 7/2019 | Aruga et al. |
| 2020/0049323 A1* | 2/2020 | Arakawa ............ G02B 5/26 |
| 2021/0373429 A1 | 12/2021 | Zhai |

FOREIGN PATENT DOCUMENTS

| | | | |
|---|---|---|---|
| CN | 214043661 U | * | 8/2021 |
| JP | 2008-172177 A | | 7/2008 |
| JP | 2015-034933 A | | 2/2015 |

(Continued)

OTHER PUBLICATIONS

Translation of CN_214043661_U (Year: 2025).*
Translation of KR_20120039362_A (Year: 2025).*

*Primary Examiner* — Jerry L Brooks
(74) *Attorney, Agent, or Firm* — Dority & Manning, P.A.

(57) ABSTRACT

A light source apparatus according to an aspect of the present disclosure includes a circuit substrate that has a first surface and a second surface provided at the side opposite from the first surface and has a first opening passing through the first and second surfaces, a first light emitter that is electrically coupled to the circuit substrate and emits first light having a first wavelength band, and a thermal diffuser provided at the second surface of the circuit substrate, and the first light emitter is provided at the thermal diffuser exposed in the first opening.

10 Claims, 9 Drawing Sheets

(56) References Cited

FOREIGN PATENT DOCUMENTS

| | | | |
|---|---|---|---|
| JP | 2019-128465 A | | 8/2019 |
| JP | 2020-178057 A | | 10/2020 |
| KR | 20120039362 A | * | 10/2010 |
| WO | WO 2007/113942 | | 10/2007 |

* cited by examiner

LIGHT SOURCE APPARATUS AND PROJECTOR

The present application is based on, and claims priority from JP Application Serial Number 2022-009395, filed Jan. 25, 2022, the disclosure of which is hereby incorporated by reference herein in its entirety.

BACKGROUND

1. Technical Field

The present disclosure relates to a light source apparatus and a projector.

2. Related Art

The light source apparatus for projectors disclosed in JP-A-2019-128465 includes a base member and light emitters held by the base member, and heat generated by the light emitters is dissipated through the base member and a heat receiving plate to a heat diffusion member.

The light source apparatus described above, however, cannot sufficiently dissipate the heat from the light emitters, leaving room for improvement in the cooling efficiency at which the light emitters are cooled.

SUMMARY

To solve the problem described above, according to a first aspect of the present disclosure, there is provided a light source apparatus including a circuit substrate that has a first surface and a second surface provided at a side opposite from the first surface and has a first opening passing through the first and second surfaces; a first light emitter that is electrically coupled to the circuit substrate and emits first light having a first wavelength band; and a thermal diffuser provided at the second surface of the circuit substrate. The first light emitter is provided at the thermal diffuser exposed in the first opening.

According to a second aspect of the present disclosure, there is provided a projector including the light source apparatus according to the first aspect, an image formation apparatus that converts light outputted from the light source apparatus into image light, and a projection optical apparatus that projects the image light outputted from the image formation apparatus.

DESCRIPTION OF EXEMPLARY EMBODIMENTS

Figure 1:
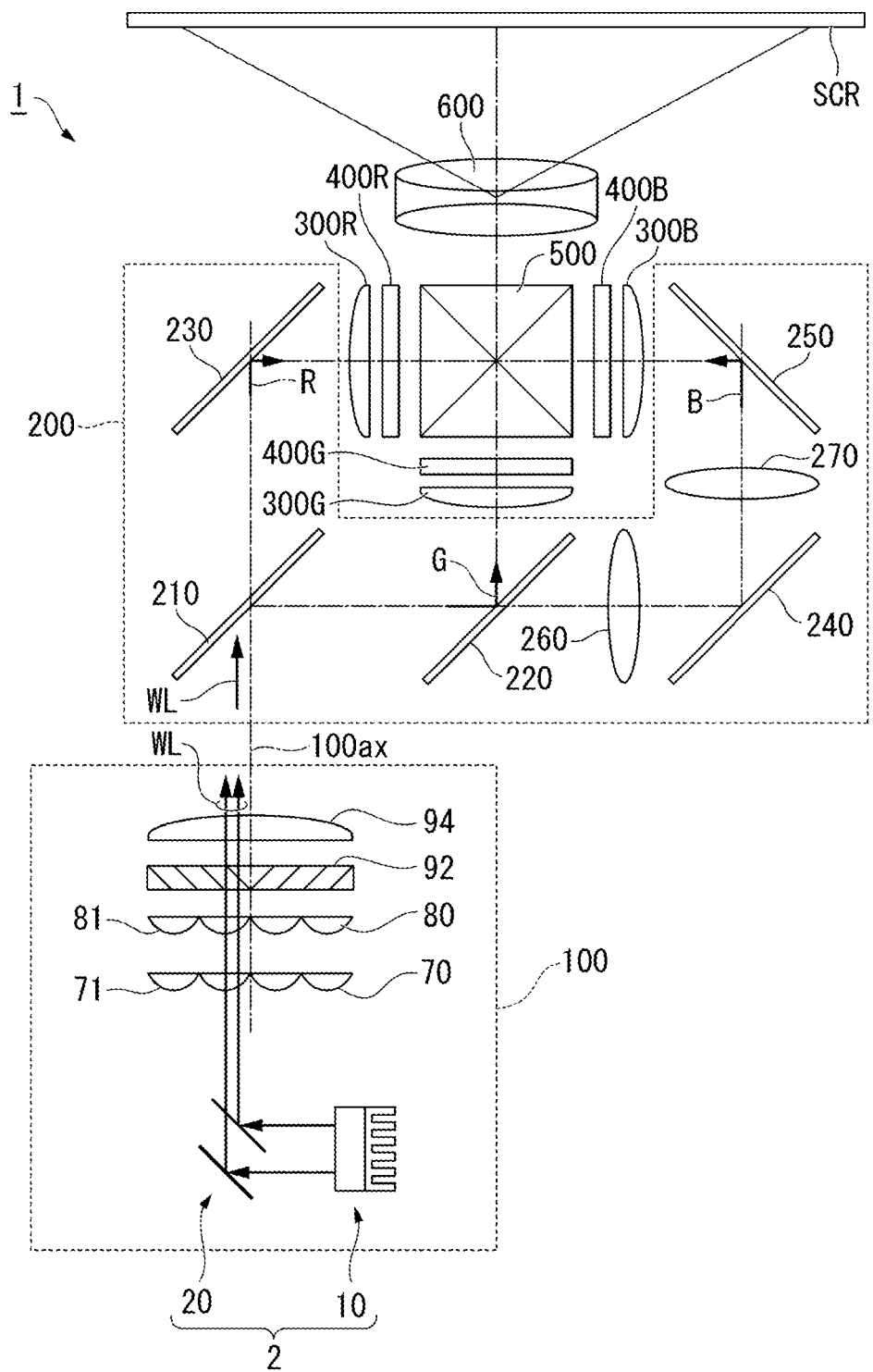
FIG. 1 is a schematic configuration diagram of a projector according to a first embodiment.

Embodiments of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

First Embodiment

FIG. 1 is a schematic configuration diagram of a projector according to the present embodiment.

A projector 1 according to the present embodiment shown in FIG. 1 includes an illuminator 100, a color separation system 200, light modulators 400R, 400G, and 400B, a cross dichroic prism 500, and a projection optical apparatus 600. The illuminator 100 outputs white light WL.

The illuminator 100 includes a light source apparatus 2, a first lens array 70, a second lens array 80, a polarization converter 92, and a superimposing lens 94. The light source apparatus 2 outputs the white light WL toward the first lens array 70.

The first lens array 70 includes a plurality of lenslets 71 for dividing the white light WL from the light source apparatus 2 into a plurality of sub-luminous fluxes. The plurality of lenslets 71 are arranged in a matrix in a plane perpendicular to an illumination optical axis 100ax of the illuminator 100. The second lens array 80 includes a plurality of lenslets 81 corresponding to the plurality of lenslets 71 of the first lens array 70. The second lens array 80 along with the superimposing lens 94 brings images of the lenslets 71 of the first lens array 70 into focus in the vicinity of an image formation region of each of the light modulators 400R, 400G, and 400B. The plurality of lenslets 81 are arranged in a matrix in a plane perpendicular to the illumination optical axis 100ax.

The polarization converter 92 converts the divided sub-luminous fluxes from the first lens array 70 into linearly polarized luminous fluxes. The polarization converter 92 includes polarization separation layers, reflection layers, and retardation films.

The polarization separation layers of the polarization converter 92 transmit one linearly polarized component of the polarized components contained in the white light WL outputted from the illuminator 100 and reflect another linearly polarized component in a direction perpendicular to the illumination optical axis 100ax. The reflection layers of the polarization converter 92 reflect the other linearly polarized component reflected off the polarization separation layers in the direction parallel to the illumination optical axis 100ax. The retardation films of the polarization converter 92 convert the other linearly polarized component reflected off the reflection layers into the one linearly polarized component.

The superimposing lens 94 focuses the sub-luminous fluxes from the polarization converter 92 and superimposes the focused sub-luminous fluxes on one another in the vicinity of the image formation region of each of the light modulators 400R, 400G, and 400B. The first lens array 70, the second lens array 80, and the superimposing lens 94 form an optical integration system that homogenizes in the image formation regions the in-plane light intensity distribution of the white light WL from the illuminator 100.

The color separation system 200 includes dichroic mirrors 210 and 220, reflection mirrors 230, 240, and 250, and relay lenses 260 and 270. The color separation system 200 separates the white light WL outputted from the illuminator 100 into red light R, green light G, and blue light B, and guides the red light R, the green light G, and the blue light B to the light modulators 400R, 400G, and 400B corresponding thereto. Field lenses 300R, 300G, and 300B are disposed between the color separation system 200 and the light modulators 400R, 400G, and 400B.

The dichroic mirror 210 transmits the red light component and reflects the green light component and the blue light component. The dichroic mirror 220 reflects the green light component and transmits the blue light component. The reflection mirror 230 reflects the red light component. The reflection mirrors 240 and 250 reflect the blue light component.

The light modulators 400R, 400G, and 400B are each formed of a liquid crystal panel that modulates the color light incident thereon in accordance with image information to form an image. The operation mode of the liquid crystal panels may be any of the TN mode, the VA mode, the horizontal field mode, or any other mode, and is not limited to a specific mode. The light modulators 400R, 400G, and 400B each include an incident-side polarizer (not shown) disposed at the light incident side and an exiting-side polarizer (not shown) disposed at the light exiting side.

The cross dichroic prism 500 combines the image light outputted from the light modulator 400R, the image light outputted from the light modulator 400G, and the image light outputted from the light modulator 400B with one another to form a color image. The cross dichroic prism 500 is formed of four right-angled prisms bonded to each other and has a substantially square shape in the plan view. In the cross dichroic prism 500, dielectric multilayer films are formed at the substantially X-letter-shaped interfaces between the right-angled prisms bonded to each other.

The color image light having exited out of the cross dichroic prism 500 is enlarged and projected by the projection optical apparatus 600 to form an image on a screen SCR. The projection optical apparatus 600 includes a plurality of projection lenses.

The configuration of the light source apparatus 2 will be subsequently described. The light source apparatus 2 includes a light source section 10 and a light combining system 20.

In the following figures, an XYZ coordinate system is used in some cases to describe the arrangement of members of the light source apparatus 2. In the present embodiment, the axis -X direction is the direction in which the white light WL is outputted from the light source apparatus 2, the axis -Y direction is the direction in which light emitters are arranged in the light source section 10, and the axis -Z direction is perpendicular to the axes X and Y and is the direction in which the light is outputted from the light source section 10.

Figure 2:
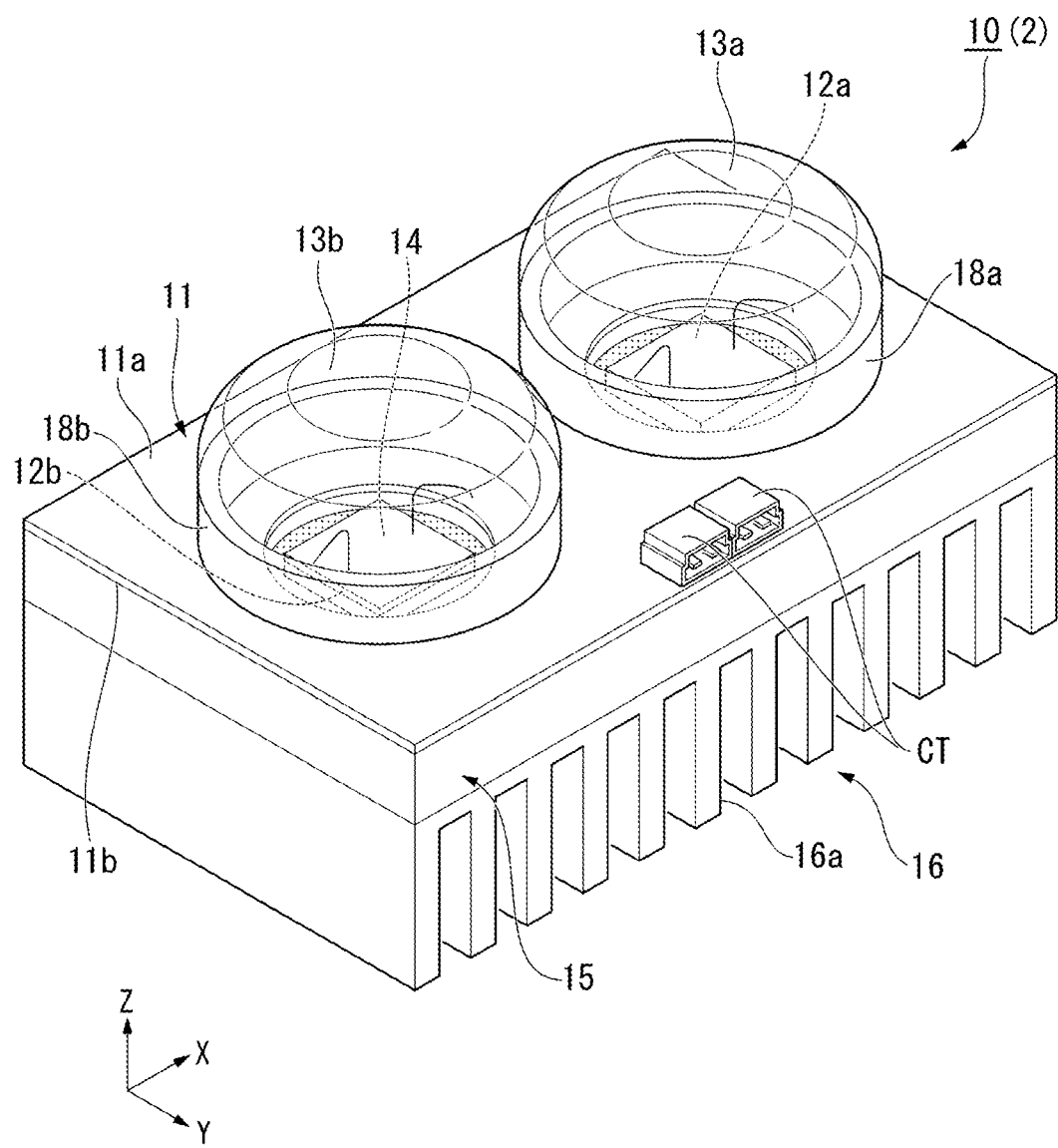
FIG. 2 is a perspective view showing a schematic configuration of a light source section in the first embodiment.

FIG. 2 is a perspective view showing a schematic configuration of the light source section 10.

The light source section 10 of the light source apparatus 2 includes a circuit substrate 11, a first light emitter 12a, a second light emitter 12b, a first condenser lens 13a, a second condenser lens 13b, a wavelength converter 14, connectors CT, a vapor chamber (heat dissipater) 15, a heat dissipating member 16, a first lens support member 18a, and a second lens support member 18b, as shown in FIG. 2.

The circuit substrate 11 has, for example, a substantially oblong shape or any other rectangular shape in the plan view. The circuit substrate 11 is made of a material having high heat dissipation capability, for example, a metal material. The circuit substrate 11 has a front surface (first surface) 11a and a rear surface (second surface) 11b provided at the side opposite from the front surface 11a.

The connectors CT are provided at the front surface 11a of the circuit substrate 11. The circuit substrate 11 is electrically coupled via the connectors CT to an external instrument, which supplies the circuit substrate 11 with electric power, drive signals, and the like. The vapor chamber 15 is provided at the rear surface 11b of the circuit substrate 11. The heat dissipating member 16 is provided at the surface, of the vapor chamber 15, opposite from the circuit substrate 11. The heat dissipating member 16 is a heat sink including a plurality of heat dissipating fins 16a. The heat dissipating member 16 may be omitted as required.

Figure 3:
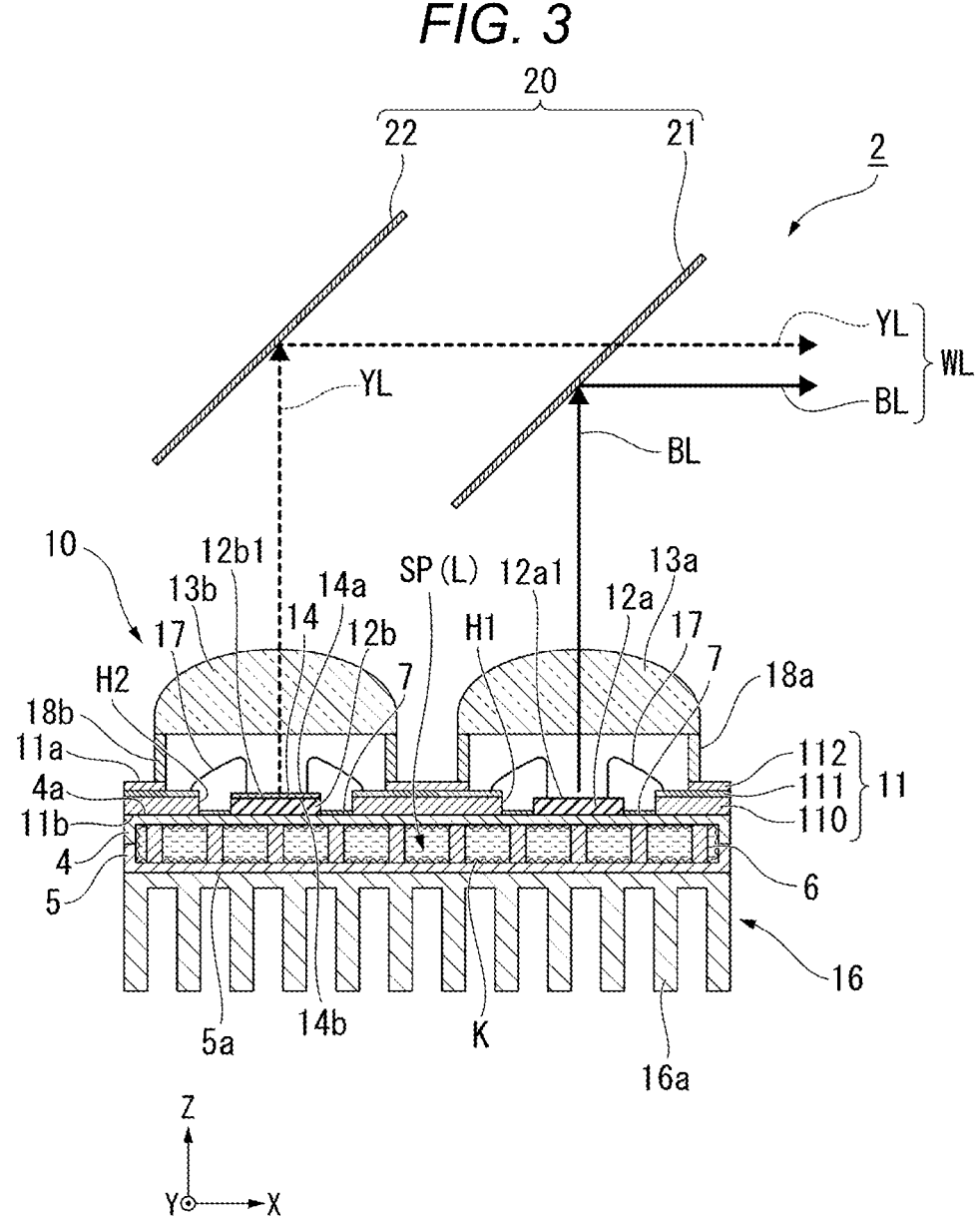
FIG. 3 is a cross-sectional view showing a schematic configuration of the light source apparatus in the first embodiment.

FIG. 3 is a cross-sectional view showing a schematic configuration of the light source apparatus 2.

The circuit substrate 11 is formed of a laminate of a base layer 110, an electrically conductive layer 111, and a protective layer 112, as shown in FIG. 3. The base layer 110 is a layer that primarily forms the circuit substrate 11. The electrically conductive layer 111 is a layer formed, for example, of a copper pattern including wiring lines and electrodes electrically coupled to the first light emitter 12a and the second light emitter 12b. The protective layer 112 is a layer for protecting the electrically conductive layer 111 and is made, for example, of a photoresist material.

The circuit substrate 11 has a first opening H1 and a second opening H2, which pass through the front surface 11a and the rear surface 11b. The circuit substrate 11 exposes part of the vapor chamber 15, via the first opening H1 and the second opening H2.

In the present embodiment, the first opening H1 and the second opening H2 are each, for example, a circular opening in the plan view. The first opening H1 and the second opening H2 each do not need to have a circular shape, and may have a polygonal shape, such as a quadrangular or triangular shape, or may each be a slit as a result of operation of cutting part of an end portion of the circuit substrate 11.

The first light emitter 12a is provided on the vapor chamber 15 exposed in the first opening H1. The first light emitter 12a is provided on the vapor chamber 15 via a support member that is not shown. Terminals (not shown) of the first light emitter 12a are electrically coupled to the electrically conductive layer 111 of the circuit substrate 11 via metal wires 17.

The first light emitter 12a is a laser light source and has a light emitting surface 12a1, via which laser light exits. The first light emitter 12a emits blue light (first light) BL having a blue wavelength band (first wavelength band). The blue light BL is light having a wavelength band ranging from 400 nm to 480 nm, and has a peak wavelength, for example, longer than 455 nm.

The second light emitter 12b is provided on the vapor chamber 15 exposed in the second opening H2. The second light emitter 12b is provided on the vapor chamber 15 via a support member that is not shown. Terminals (not shown) of the second light emitter 12b are electrically coupled to the electrically conductive layer 111 of the circuit substrate 11 via metal wires 17.

The second light emitter 12b is a laser light source and has a light emitting surface 12b1, via which laser light exits. In the present embodiment, the second light emitter 12b emits excitation light as second light having the first wavelength band.

The vapor chamber 15 cools the first light emitter 12a, which becomes hot when emitting the blue light BL, which is laser light, and the second light emitter 12b, which becomes hot when emitting the excitation light, which is laser light, by dissipating the heat from the first light emitter 12a and the second light emitter 12b.

The vapor chamber 15 includes a heat receiving plate 4, which supports the first light emitter 12a and the second light emitter 12b, a heat dissipating plate 5, which is provided at the side, of the heat receiving plate 4, opposite from the first light emitter 12a and the second light emitter 12b, and a plurality of coupling members 6, which thermally couple the heat receiving plate 4 and the heat dissipating plate 5 to each other. The plurality of coupling members 6 are disposed in a housing compartment SP.

In the present embodiment, in the plan view of the surface (heat receiver 4a), of the heat receiving plate 4, that supports the first light emitter 12a, some of the plurality of coupling members 6 are provided at positions where these coupling members 6 overlap with the first light emitter 12a. In the present embodiment, some of the plurality of coupling members 6 are provided in positions where these coupling members 6 overlap with the second light emitter 12b.

The vapor chamber 15 includes a heat receiver 4a, which receives the heat from the first light emitter 12a and the second light emitter 12b, a heat dissipater 5a, which dissipates the heat received by the heat receiver 4a, and the housing compartment SP, which houses and seals a working fluid L. The heat receiving plate 4 and the heat dissipating plate 5 are each a flat-plate-shaped member having a recess corresponding to the housing compartment SP.

The heat receiver 4a is provided at the surface, of the heat receiving plate 4, that is opposite from the housing compartment SP. The heat receiver 4a receives the heat from the first light emitter 12a and uses the heat to transform the working fluid L from liquid into gas. In the present embodiment, the first light emitter 12a is disposed in the portion, of the heat receiver 4a, that is exposed in the first opening H1 of the circuit substrate 11.

The heat dissipater 5a is provided at the surface, of the heat dissipating plate 5, that is opposite from the housing compartment SP. The heat dissipater 5a dissipates the heat of the gaseous working fluid L flowing in the housing compartment SP to condense the working fluid L back into liquid. The heat dissipating member 16 is provided at the portion, of the outer surface of the heat dissipating plate 5, that corresponds to the heat dissipater 5a.

In the present embodiment, at least part of the heat receiver 4a of the vapor chamber 15 is provided with a reflection film 7. Specifically, the reflection film 7 is provided in the portions of the heat receiver 4a that are exposed in the first opening H1 and the second opening H2 of the circuit substrate 11. That is, the reflection film 7 is provided, out of the heat receiver 4a, in the region where the first light emitter 12a is disposed and the region where the second light emitter 12b is disposed. The reflection film 7 is formed of a film made of metal, such as Ni and Ag, or a dielectric multilayer film that excels in light reflectivity. The reflection film 7 may instead be provided between the first light emitter 12a and the heat receiver 4a and between the second light emitter 12b and the heat receiver 4a.

The vapor chamber 15 has a wick structure K provided in the housing compartment SP. The wick structure K is provided at least at the inner surfaces of the heat receiving plate 4 and the heat dissipating plate 5. The wick structure K may instead be provided at the surfaces of the plurality of coupling members 6.

The wick structure K is permeated with the working fluid L sealed in the depressurized housing compartment SP. The wick structure K, which is a finely woven structure, can produce a capillary force. The heat receiver 4a supplies the working fluid L to the portion, of the heat receiving plate 4, that is in contact with the first light emitter 12a with the aid of the capillary force produced by the wick structure K.

In the vapor chamber 15 in the present embodiment, the heat receiver 4a vaporizes the working fluid L having permeated the wick structure K with the aid of the heat transferred from the first light emitter 12a and the second light emitter 12b. The working fluid L vaporized by the heat receiver 4a passes through a channel formed in the housing compartment SP and moves to the heat dissipater 5a of the heat dissipating plate 5. The heat dissipater 5a efficiently dissipates the heat of the working fluid L out of the vapor chamber 15 via the heat dissipating fins 16a of the heat dissipating member 16.

The working fluid L condensed to liquefy by the heat dissipater 5a permeates the wick structure K provided in the housing compartment SP, is supplied to the heat receiver 4a by the capillary force produced by the wick structure K, and is vaporized again by the heat receiver 4a. The vapor chamber 15 thus cools the first light emitter 12a and the second light emitter 12b by diffusing the heat from the first light emitter 12a and the second light emitter 12b via the heat receiver 4a to the heat dissipater 5a.

The blue light BL emitted from the first light emitter 12a enters the first condenser lens 13a. The first condenser lens 13a is a convex lens that picks up and parallelizes the blue light BL. The first condenser lens 13a is attached to the circuit substrate 11 via the first lens support member 18a. The first lens support member 18a is a ring-shaped member in the plan view and holds the bottom of the first condenser lens 13a. In the present embodiment, the first light emitter 12a is housed in a space defined by the first condenser lens 13a, the first lens support member 18a, the circuit substrate 11, and the vapor chamber 15. The first light emitter 12a may be encapsulated by filling the space that houses the first light emitter 12a with a translucent resin material.

In the present embodiment, the wavelength converter 14 is disposed at the light emitting surface 12b1 of the second light emitter 12b. The wavelength converter 14 has a rear surface 14a and a front surface 14b. The rear surface 14a is a surface which is in contact with the light emitting surface 12b1 and on which the excitation light emitted via the light emitting surface 12b1 is incident. The front surface 14b is a surface which is opposite from the rear surface 14a and via which fluorescence YL, which will be described below, exits. The rear surface 14a of the wavelength converter 14 and the light emitting surface 12b1 of the second light emitter 12b may be bonded directly or via an optical adhesive to each other.

The wavelength converter 14 is formed, for example, of a phosphor layer containing $(Y, Gd)_3(Al, Ga)_5O_{12}$:Ce, which is a YAG-based phosphor. The wavelength converter 14 is excited by the excitation light from the second light emitter 12b. The wavelength converter 14 converts the excitation light into the fluorescence (converted wavelength light) YL having a yellow wavelength band (third wavelength band) different from the blue wavelength band. The fluorescence YL is light having a wavelength band ranging, for example, from 550 to 640 nm.

The wavelength converter 14 emits the fluorescence YL, which has been converted from the excitation light, via the front surface 14b. That is, the front surface 14b of the wavelength converter 14 functions as a light exiting surface via which the fluorescence YL exits.

The fluorescence YL emitted from the wavelength converter 14 enters the second condenser lens 13b. The second condenser lens 13b is a convex lens that picks up and parallelizes the fluorescence YL. The second condenser lens 13b is attached to the circuit substrate 11 via the second lens support member 18b. The second lens support member 18b is a ring-shaped member in the plan view and holds the bottom of the second condenser lens 13b. In the present embodiment, the second light emitter 12b and the wavelength converter 14 are housed in a sealed space defined by the second condenser lens 13b, the second lens support member 18b, the circuit substrate 11, and the vapor chamber 15. The second light emitter 12b may be encapsulated by filling the space that houses the second light emitter 12b with a translucent resin material.

Based on the configuration described above, the light source section 10 outputs light containing the blue light BL and the fluorescence YL. The light outputted from the light source section 10 enters the light combining system 20. The light combining system 20 combines the blue light BL emitted from the first light emitter 12a and the fluorescence YL emitted from the second light emitter 12b. The light combining system 20 includes a first dichroic mirror 21 and a second dichroic mirror 22. The first dichroic mirror 21 and the second dichroic mirror 22 are disposed along the axis -X direction, along which the first light emitter 12a and the second light emitter 12b are arranged.

The second dichroic mirror 22 is optically characterized so as to reflect light having the yellow wavelength band (third wavelength band). The second dichroic mirror 22 is disposed so as to face the second condenser lens 13b of the light source section 10. The second dichroic mirror 22 is disposed so as to incline by an angle of 45° with respect to the optical axis of the fluorescence YL that exits out of the second condenser lens 13b. The second dichroic mirror 22 reflects the fluorescence YL toward the first dichroic mirror 21 (side +X).

The first dichroic mirror 21 is optically characterized so as to reflect light having the blue wavelength band (first wavelength band) and transmit light having the yellow wavelength band (third wavelength band). The first dichroic mirror 21 is disposed so as to face the first condenser lens 13a of the light source section 10. The first dichroic mirror 21 is disposed so as to incline by the angle of 45° with respect to the optical axis of the blue light BL that exits out of the first condenser lens 13a. The first dichroic mirror 21 reflects the blue light BL and transmits the fluorescence YL from the second dichroic mirror 22 to cause the white light (combined light) WL, which is the combination of the blue light BL and the fluorescence YL, to exit toward the side +X.

As described above, the light source apparatus 2 according to the present embodiment includes the circuit substrate 11 having the first opening H1, the first light emitter 12a, which is electrically coupled to the circuit substrate 11 and emits the blue light BL, and the vapor chamber 15 provided at the rear surface 11b of the circuit substrate 11, and the first light emitter 12a is provided in the vapor chamber 15 exposed in the first opening H1. The projector 1 according to the present embodiment includes the second light emitter 12b, which is electrically coupled to the circuit substrate 11 and emits the excitation light, and the wavelength converter 14 disposed at the light emitting surface 12b1 of the second light emitter 12b, and the second light emitter 12b is provided in the vapor chamber 15 exposed in the second opening H2.

The light source apparatus 2 according to the present embodiment, in which the first light emitter 12a and the second light emitter 12b are directly provided at the vapor chamber 15, allows an increase in the cooling efficiency at which the first light emitter 12a and the second light emitter 12b are cooled. The light emission efficiency of the first light emitter 12a and the second light emitter 12b is thus increased, whereby bright white light WL can be generated.

In the light source apparatus 2 according to the present embodiment, the vapor chamber 15 includes the heat receiving plate 4, the heat dissipating plate 5, and the plurality of coupling members 6.

According to the configuration described above, the heat can be efficiently transferred from the heat receiver 4a of the heat receiving plate 4 toward the heat dissipater 5a of the heat dissipating plate 5 via the coupling members 6. The cooling efficiency at which the first light emitter 12a and the second light emitter 12b are cooled can thus be further increased.

Furthermore, the vapor chamber 15 in the present embodiment, in which the heat receiving plate 4 and the heat dissipating plate 5 are coupled to each other by the plurality of coupling member 6, has enhanced mechanical strength as compared with the mechanical strength achieved when the coupling members 6 are not provided. The light source apparatus 2 according to the present embodiment, which includes the highly durable vapor chamber 15, is therefore so reliable that the cooling performance of the light source apparatus 2 is maintained over a long period of time.

In the light source apparatus 2 according to the present embodiment, in the plan view of the surface, of the heat receiving plate 4, that supports the first light emitter 12a, some of the plurality of coupling members 6 are provided at positions where these coupling members 6 overlap with the first light emitter 12a.

The first light emitter 12a has a small area and therefore outputs a high heat flux. The working fluid L could instantaneously evaporate, which is called a dry-out phenomenon, at the heat receiver 4a immediately under the first light emitter 12a. When the dry-out phenomenon occurs, the first light emitter 12a cannot be cooled.

In contrast, even when the dry-out phenomenon occurs, the first light emitter 12a can be cooled in the present embodiment, in which the heat is dissipated toward the heat dissipating plate 5 via the coupling members 6 located immediately below the first light emitter 12a.

Furthermore, the present embodiment, in which some of the coupling members 6 are provided in positions where these coupling members 6 overlap with the second light emitter 12b, can suppress a decrease in the cooling efficiency due to the dry-out phenomenon also in the second light emitter 12b.

The projector 1 according to the present embodiment includes the light source apparatus 2, the light modulators 400R, 400G, and 400B, which modulate the light from the light source apparatus 2 in accordance with image information to form image light, and the projection optical apparatus 600, which projects the image light.

The projector 1 according to the present embodiment, which includes the light source apparatus 2, which generates bright white light WL by using the first light emitter 12a and the second light emitter 12b having increased light emission efficiency, can display a bright image.

Second Embodiment

The light source apparatus according to a second embodiment will be subsequently described. The present embodiment differs from the first embodiment in that three light emitters are provided. In the following description, configurations and members common to those in the first embodiment have the same reference characters and will not be described in detail.

Figure 4:
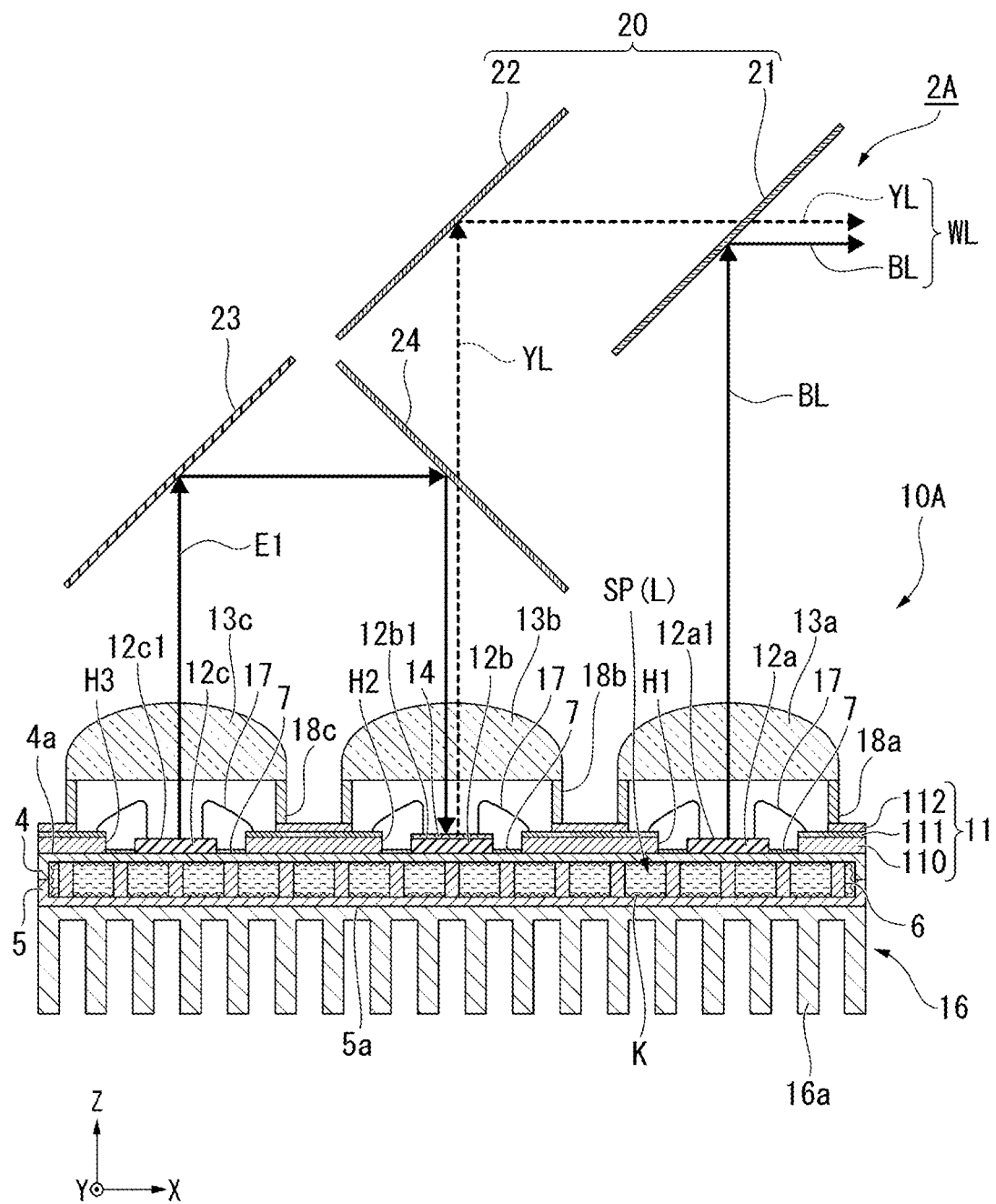
FIG. 4 is a cross-sectional view showing a schematic configuration of the light source apparatus according to a second embodiment.

FIG. 4 is a cross-sectional view showing a schematic configuration of a light source apparatus 2A according to the present embodiment.

The light source apparatus 2A includes a light source section 10A, the light combining system 20, a mirror 23, and a third dichroic mirror (optical element) 24, as shown in FIG. 4.

The light source section 10A in the present embodiment includes the circuit substrate 11, the first light emitter 12a, the second light emitter 12b, a third light emitter 12c, the first condenser lens 13a, the second condenser lens 13b, a third condenser lens 13c, the wavelength converter 14, the vapor chamber 15, the heat dissipating member 16, the first lens support member 18a, the second lens support member 18b, and a third lens support member 18c.

The circuit substrate 11 in the present embodiment has the first opening H1, the second opening H2, and a third opening H3, which pass through the front surface 11a and the rear surface 11b. The first opening H1, the second opening H2, and the third opening H3 expose part of the vapor chamber 15. The third opening H3 is, for example, a circular opening in the plan view, as the first opening H1 and the second opening H2 are. In the present embodiment, the reflection film 7 is also provided on the heat receiver 4a exposed in the third opening H3 of the circuit substrate 11. The reflection film 7 may be omitted as required, or may be provided in any one or more of the regions (heat receiver 4a) exposed in the first opening H1, the second opening H2, and the third opening H3.

The third light emitter 12c is provided on the vapor chamber 15 exposed in the third opening H3. The third light emitter 12c is provided on the vapor chamber 15 via a support member that is not shown. Terminals (not shown) of the third light emitter 12c are electrically coupled to the electrically conductive layer 111 of the circuit substrate 11 via metal wires 17. In the present embodiment, some of the plurality of coupling members 6 are provided in positions where these coupling members 6 overlap with the third light emitter 12c.

The third light emitter 12c is a laser light source and has a light emitting surface 12c1, via which laser light exits. The third light emitter 12c emits auxiliary excitation light (third light) E1 having a short wavelength band (second wavelength band) different from the blue wavelength band (first wavelength band). The auxiliary excitation light E1 is light having a wavelength band shorter than the blue wavelength band, for example, light having a peak wavelength shorter than 455 nm.

The auxiliary excitation light E1 outputted from the third light emitter 12c enters the third condenser lens 13c. The third condenser lens 13c is a convex lens that picks up and parallelizes the auxiliary excitation light E1. The third condenser lens 13c is attached to the circuit substrate 11 via the third lens support member 18c. The third lens support member 18c is a ring-shaped member in the plan view and holds the bottom of the third condenser lens 13c. In the present embodiment, the third light emitter 12c is housed in a space defined by the third condenser lens 13c, the third lens support member 18c, the circuit substrate 11, and the vapor chamber 15. The third light emitter 12c may be encapsulated by filling the space that houses the third light emitter 12c with a translucent resin material.

Based on the configuration described above, the light source section 10A in the present embodiment outputs the blue light BL, the fluorescence YL, and the auxiliary excitation light E1. The auxiliary excitation light E1 outputted from the light source section 10A is incident on the mirror 23. The mirror 23 is disposed so as to face the third condenser lens 13c of the light source section 10. The mirror 23 is disposed so as to incline by the angle of 45° with respect to the optical axis of the auxiliary excitation light E1 that exits out of the third condenser lens 13c. The mirror 23 reflects the auxiliary excitation light E1 toward one side (side +X) of the axis −X direction.

The auxiliary excitation light E1 reflected off the mirror 23 is incident on the third dichroic mirror 24. The third dichroic mirror 24 is optically characterized so as to reflect light having the blue wavelength band (first wavelength band) or the short wavelength band (second wavelength band) and transmit light having the yellow wavelength band (third wavelength band).

In the present embodiment, the third dichroic mirror 24 is disposed between the second dichroic mirror 22 of the light combining system 20 and the second condenser lens 13b of the light source section 10. Specifically, the third dichroic mirror 24 is disposed so as to face the second focusing lens 13b. The third dichroic mirror 24 is disposed so as to incline by the angle of 45° with respect to the optical axis of the fluorescence YL that exits out of the second condenser lens 13b. The third dichroic mirror 24 reflects the auxiliary excitation light E1 toward the light source section 10A (side −Z) and transmits the fluorescence YL toward the second dichroic mirror 22 (side +Z).

The auxiliary excitation light E1 reflected off the third dichroic mirror 24 is collected by the second condenser lens 13b and incident on the front surface 14b of the wavelength converter 14. The auxiliary excitation light E1 enters the wavelength converter 14 via the front surface (second incidence surface) 14b, which differs from the rear surface (first incidence surface) 14a, on which the excitation light (second light) E is incident, and converted by the wavelength converter 14 into the fluorescence (converted wavelength light) YL.

In the present embodiment, the wavelength converter 14, which the excitation light enters via both the rear surface 14a and the front surface 14b, can efficiently generate the fluorescence YL.

In the present embodiment, the auxiliary excitation light E1 is light having a wavelength band shorter than the blue wavelength band of the excitation light, whereby the fluorescence conversion efficiency of the wavelength converter 14 can be further increased.

The wavelength converter 14 in the present embodiment can therefore generate bright fluorescence YL.

The light source section 10A in the present embodiment outputs light containing the blue light BL and the fluorescence YL. The blue light BL out of the light outputted from the light source section 10A is reflected off the first dichroic mirror 21 of the light combining system 20, and the fluorescence YL out of the light outputted from the light source section 10A passes through the third dichroic mirror 24 is reflected off the second dichroic mirror 22, and is combined with the blue light BL at the first dichroic mirror 21 into the white light WL.

As described above, the light source apparatus 2A according to the present embodiment, in which the first light emitter 12a, the second light emitter 12b, and the third light emitter 12c are directly provided at the vapor chamber 15, allows an increase in the cooling efficiency at which the first light emitter 12a, the second light emitter 12b, and the third light emitter 12c are cooled. Furthermore, in the present embodiment, the auxiliary excitation light E1 emitted from the third light emitter 12c can be used to increase the conversion efficiency at which the fluorescence YL is generated.

The light source apparatus 2A according to the present embodiment can therefore generate brighter white light WL.

Third Embodiment

The light source apparatus according to a third embodiment will be subsequently described. The present embodiment differs from the first embodiment in that three light emitters are provided. In the following description, configurations and members common to those in the first embodiment have the same reference characters and will not be described in detail.

Figure 5:
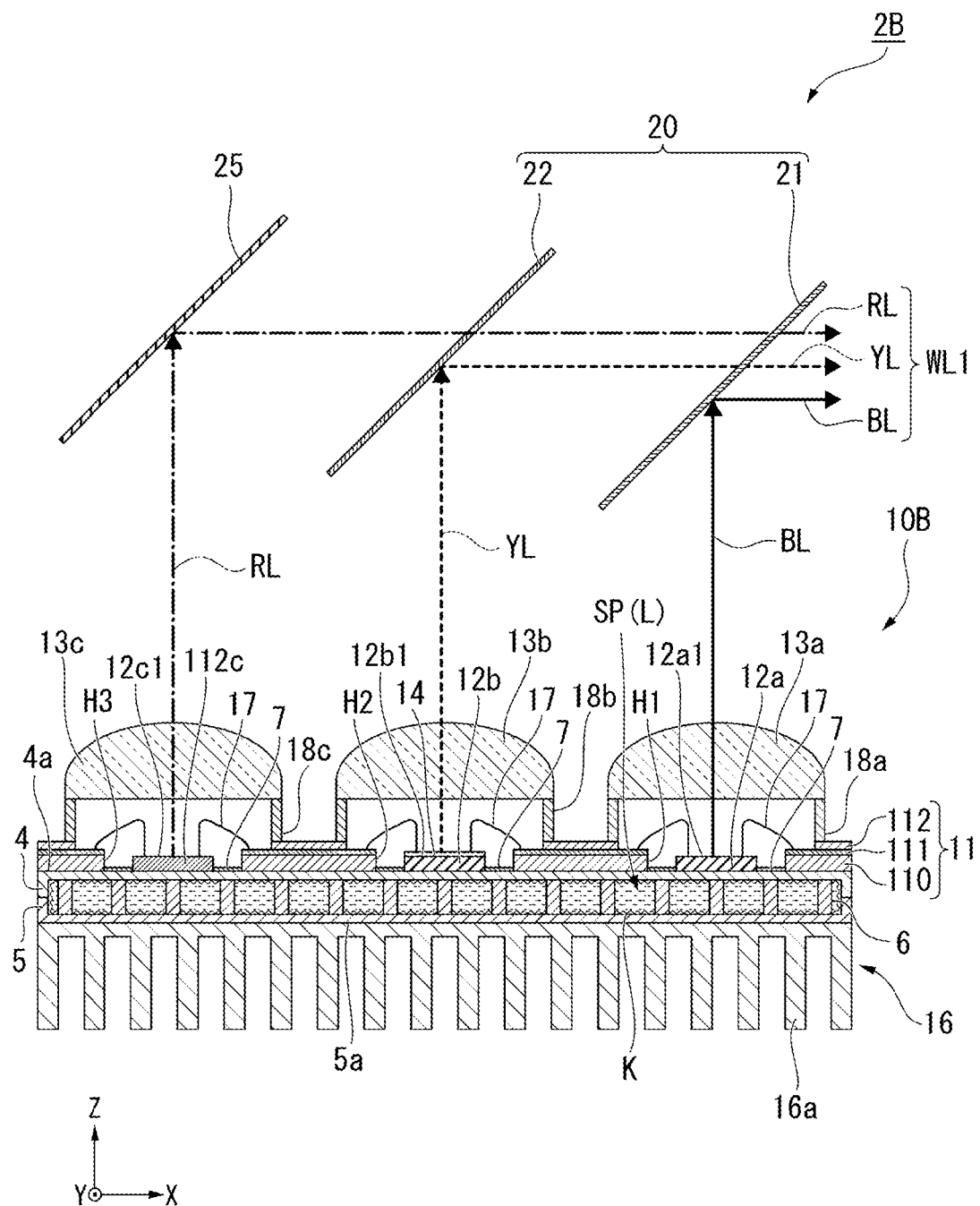
FIG. 5 is a cross-sectional view showing a schematic configuration of the light source apparatus according to a third embodiment.

FIG. 5 is a cross-sectional view showing a schematic configuration of a light source apparatus 2B according to the present embodiment.

The light source apparatus 2B includes a light source section 10B, the light combining system 20, and a mirror 25, as shown in FIG. 5.

The light source section 10B in the present embodiment includes the circuit substrate 11, the first light emitter 12a, the second light emitter 12b, a third light emitter 112c, the first condenser lens 13a, the second condenser lens 13b, the third condenser lens 13c, the wavelength converter 14, the vapor chamber 15, the heat dissipating member 16, the first lens support member 18a, the second lens support member 18b, and the third lens support member 18c.

The third light emitter 112c in the present embodiment emits light having a wavelength band different from the wavelength band of the light from the third light emitter 12c in the second embodiment. Specifically, the third light emitter 112c in the present embodiment emits red light (third light) RL having a red wavelength band (fourth wavelength band) different from the blue wavelength band (first wavelength band) and the short wavelength band (second wavelength band). The red light RL is light having a wavelength band ranging, for example, from 640 to 770 nm.

The light source section 10B in the present embodiment outputs the blue light BL, the fluorescence YL, and the red light RL. The red light RL outputted from the light source section 10B is incident on the mirror 25. The mirror 25 is disposed so as to face the third condenser lens 13c of the light source section 10. The mirror 25 is disposed so as to incline by the angle of 45° with respect to the optical axis of the red light RL that exits out of the third condenser lens 13c. The mirror 25 reflects the red light RL toward one side (side +X) of the axis −X direction.

The red light RL reflected off the mirror 25 is incident on the second dichroic mirror 22. In the present embodiment, the second dichroic mirror 22 is optically characterized so as to transmit the red light RL and reflect the fluorescence YL. In the light combining system 20 in the present embodiment, the second dichroic mirror 22 transmits the red light RL and the fluorescence YL toward the one side (side +X) of the axis −X direction and reflects the blue light BL toward the one side (side +X) of the axis −X direction to combine the red light RL, the fluorescence YL, and the blue light BL with one another into white light WL1.

The light source apparatus 2B according to the present embodiment, in which the first light emitter 12a, the second light emitter 12b, and the third light emitter 112c are directly provided at the vapor chamber 15, allows an increase in the cooling efficiency at which the first light emitter 12a, the second light emitter 12b, and the third light emitter 112c are cooled.

Furthermore, the light source apparatus 2B according to the present embodiment generates the white light WL1 containing the red light RL emitted from the third light emitter 112c and can therefore compensate for lack of the red component in the white light WL outputted from the light source apparatus 2 according to the first embodiment. That is, the light source apparatus 2B according to the present embodiment can generate white light WL1 having enhanced red reproducibility.

Therefore, since the light source apparatus 2B according to the present embodiment generates the white light WL1 having high color reproducibility, a projector using the light source apparatus 2B according to the present embodiment has an extended color gamut and can therefore display a high-quality image.

Fourth Embodiment

The light source apparatus according to a fourth embodiment will be subsequently described. The present embodiment differs from the first embodiment in that four light emitters are provided. In the following description, configurations and members common to those in the first embodiment have the same reference characters and will not be described in detail.

Figure 6:
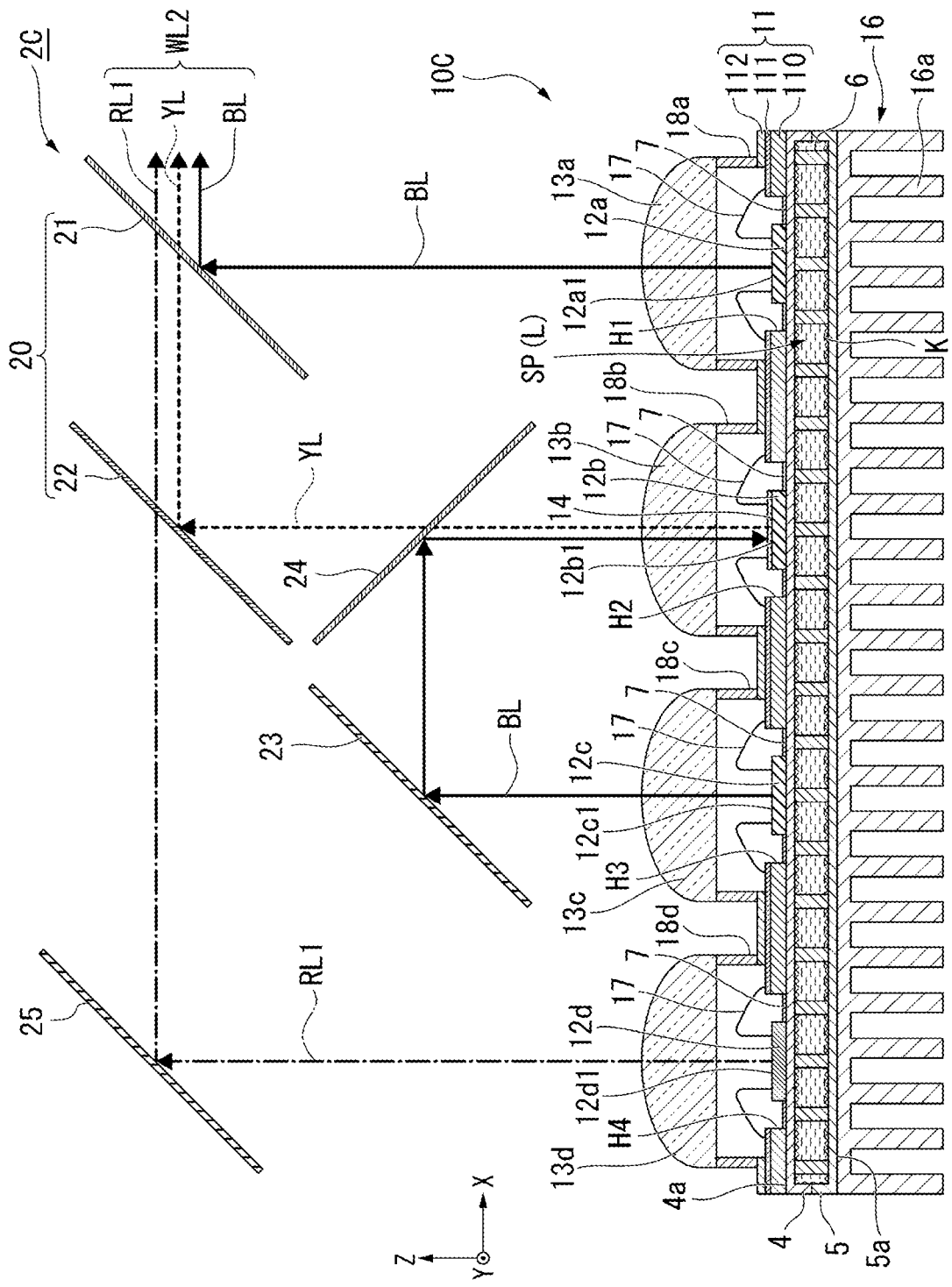
FIG. 6 is a cross-sectional view showing a schematic configuration of the light source apparatus according to a fourth embodiment.

FIG. 6 is a cross-sectional view showing a schematic configuration of a light source apparatus 2C according to the present embodiment.

The light source apparatus 2C includes a light source section 10C, the light combining system 20, the mirror 23, the third dichroic mirror (optical element) 24, and the mirror 25, as shown in FIG. 6. That is, the light source apparatus 2C according to the present embodiment has a configuration that is the combination of the configuration of the light source apparatus 2A according to the second embodiment and the configuration of the light source apparatus 2B according to the third embodiment.

The light source section 10C in the present embodiment includes the circuit substrate 11, the first light emitter 12a, the second light emitter 12b, the third light emitter 12c, a fourth light emitter 12d, the first condenser lens 13a, the second condenser lens 13b, the third condenser lens 13c, a fourth condenser lens 13d, the wavelength converter 14, the vapor chamber 15, the heat dissipating member 16, the first lens support member 18a, the second lens support member 18b, the third lens support member 18c, and a fourth lens support member 18d.

The circuit substrate 11 in the present embodiment has the first opening H1, the second opening H2, the third opening H3, and a fourth opening H4, which pass through the front surface 11a and the rear surface 1ib. The first opening H1, the second opening H2, the third opening H3, and the fourth opening H4 expose part of the vapor chamber 15. The fourth opening H4 is, for example, a circular opening in the plan view, as the first opening H1, the second opening H2, and the third opening H3 are. In the present embodiment, the reflection film 7 is also provided on the heat receiver 4a exposed in the fourth opening H4 of the circuit substrate 11. The reflection film 7 may be omitted as required, or may be provided in any one or more of the regions (heat receiver 4a) exposed in the first opening H1, the second opening H2, the third opening H3, and the fourth opening H4.

The fourth light emitter 12d is a laser light source and has a light emitting surface 12d1, via which laser light exits. The fourth light emitter 12d is provided on the vapor chamber 15 exposed in the fourth opening H4. The fourth light emitter 12d is provided on the vapor chamber 15 via a support member that is not shown. Terminals (not shown) of the fourth light emitter 12d are electrically coupled to the electrically conductive layer 111 of the circuit substrate 11 via metal wires 17. In the present embodiment, some of the plurality of coupling members 6 are provided in positions where these coupling members 6 overlap with the fourth light emitter 12d.

The fourth light emitter 12d emits red light (fourth light) RL1 having the red wavelength band (fourth wavelength band) different from the blue wavelength band (first wavelength band) and the short wavelength band (second wavelength band).

The light source section 10C in the present embodiment outputs the blue light BL, the fluorescence YL, the auxiliary excitation light E1, and the red light RL1. The auxiliary excitation light E1 outputted from the light source section 10C is used to generate the fluorescence YL. The red light RL1 outputted from the light source section 10C is reflected off the mirror 25 and incident on the second dichroic mirror 22. In the present embodiment, the second dichroic mirror 22 is optically characterized so as to transmit the red light RL1 and reflect the fluorescence YL.

In the light source apparatus 2C according to the present embodiment, the light combining system 20 combines the red light RL1, the fluorescence YL, and the blue light BL with one another to generate white light WL2.

The light source apparatus 2C according to the present embodiment, in which the first light emitter 12a, the second light emitter 12b, the third light emitter 12c, and the fourth light emitter 12d are directly provided at the vapor chamber 15, allows an increase in the cooling efficiency at which the first light emitter 12a, the second light emitter 12b, the third light emitter 12c, and the fourth light emitter 12d are cooled.

Furthermore, the light source apparatus 2C according to the present embodiment can generate the white light WL2 having enhanced red reproducibility by using the red light RL1 emitted from the fourth light emitter 12d.

Moreover, the light source apparatus 2C according to the present embodiment allows an increase in the conversion efficiency at which the fluorescence YL is generated by using the auxiliary excitation light E1 emitted from the third light emitter 12c.

Therefore, since light source apparatus 2C according to the present embodiment generates bright white light WL2 having high color reproducibility, a projector using the light source apparatus 2C according to the present embodiment has an extended color gamut and can therefore display a higher-quality image.

Fifth Embodiment

The light source apparatus according to a fifth embodiment will be subsequently described. The present embodiment differs from the first embodiment in that three light emitters are provided and the vapor chamber is differently shaped. In the following description, configurations and members common to those in the first embodiment have the same reference characters and will not be described in detail.

Figure 7:
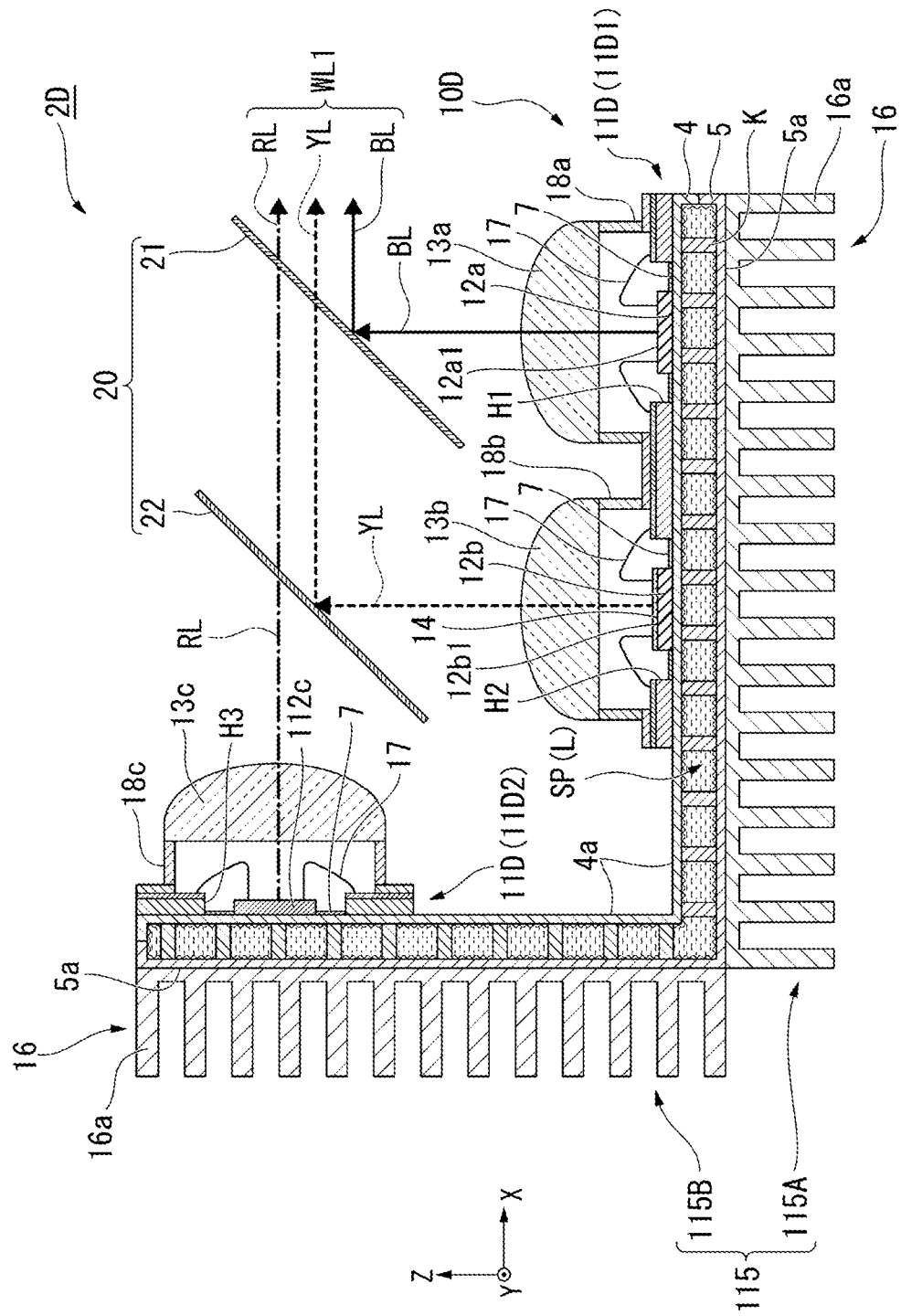
FIG. 7 is a cross-sectional view showing a schematic configuration of the light source apparatus according to a fifth embodiment.

FIG. 7 is a cross-sectional view showing a schematic configuration of a light source apparatus 2D according to the present embodiment.

The light source apparatus 2D includes a light source section 10D and the light combining system 20, as shown in FIG. 7. The light source apparatus 2D according to the present embodiment corresponds to a variation of the light source apparatus 2B according to the third embodiment.

The light source section 10D in the present embodiment includes a circuit substrate 11D, the first light emitter 12a, the second light emitter 12b, the third light emitter 112c, the first condenser lens 13a, the second condenser lens 13b, the third condenser lens 13c, the wavelength converter 14, a vapor chamber 115, the heat dissipating member 16, the first lens support member 18a, the second lens support member 18b, and the third lens support member 18c.

The vapor chamber 115 in the present embodiment has a substantially L-letter-like cross-sectional shape. Specifically, the vapor chamber 115 includes a first extending section 115A, which extends in the axis −X direction (first direction) and is provided with the first light emitter 12a and the second light emitter 12b, and a second extending section 115B, which extends from one end of the first extending section 115A (end facing side −X) in the axis −Z direction (second direction), which intersects with the axis −X direction, and is provided with the third light emitting element 112c.

The circuit substrate 11D in the present embodiment includes a first section 11D1 provided at the first extending section 115A of the vapor chamber 115 and a second section 11D2 provided at the second extending section 115B of the vapor chamber 115. The first opening H1 and the second opening H2 are formed in the first section 11D1, and the third opening H3 is formed in the second section 11D2. The first light emitter 12a and the second light emitter 12b are provided on the circuit substrate 11D (first section 11D1) exposed in the first opening H1 and the second opening H2, respectively, and the third light emitter 12c is provided on the circuit substrate 11D (second section 11D2) exposed in the third opening H3.

In the present embodiment, the third light emitter 112c, the second dichroic mirror 22, and the first dichroic mirror 21 are arranged in the axis −X direction. In the present embodiment, the red light RL emitted from the third light emitter 112c is combined with the fluorescence YL at the second dichroic mirror 22, and the combined light is incident on the first dichroic mirror 21. The fluorescence YL and the red light RL are combined with the blue light BL at the first dichroic mirror 21, and the resultant white light WL1 exits in the axis −X direction.

The heat dissipating member 16 in the present embodiment is provided at the heat dissipater 5a of the first extending section 115A and the second extending section 115B of the vapor chamber 115.

The light source apparatus 2D according to the present embodiment, in which the vapor chamber 115 has the L-letter-like cross-sectional shape, allows reduction in the dimension of the light source apparatus 2D in the axis −X direction even when three light emitters are provided. Furthermore, since the mirror 25 for reflecting the red light RL can be omitted as compared with the configuration of the light source apparatus 2B according to the third embodiment, the number of parts can be reduced.

Sixth Embodiment

The light source apparatus according to a sixth embodiment will be subsequently described. The present embodiment differs from the first embodiment in that three light emitters are provided and the vapor chamber is differently shaped. In the following description, configurations and members common to those in the first embodiment have the same reference characters and will not be described in detail.

Figure 8:
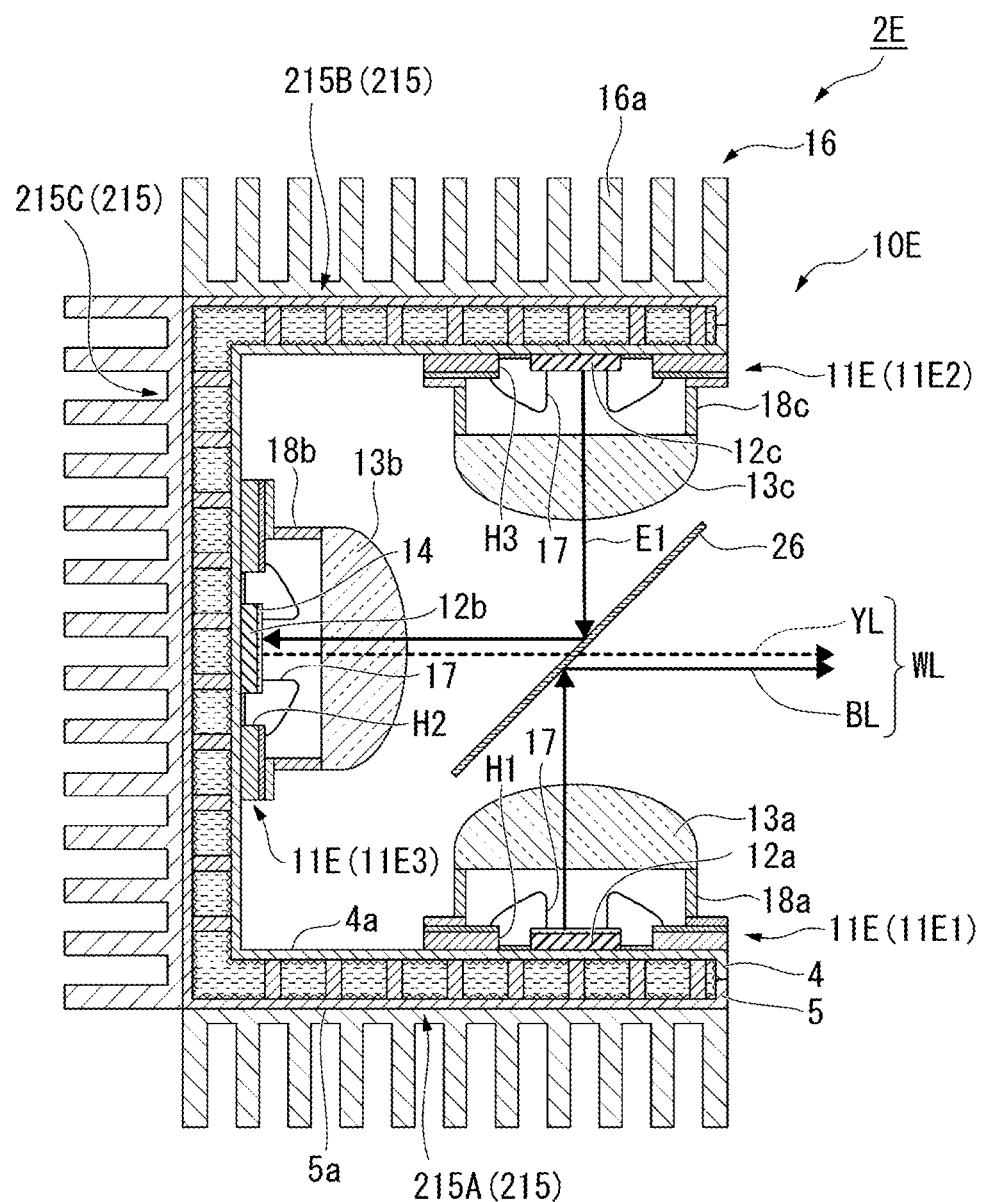
FIG. 8 is a cross-sectional view showing a schematic configuration of the light source apparatus according to a sixth embodiment.

FIG. 8 is a cross-sectional view showing a schematic configuration of a light source apparatus 2E according to the present embodiment.

The light source apparatus 2E includes a light source section 10E and a fourth dichroic mirror (optical element) 26, as shown in FIG. 8. The light source apparatus 2E according to the present embodiment corresponds to a variation of the light source apparatus 2A according to the second embodiment.

The light source section 10E in the present embodiment includes a circuit substrate 11E, the first light emitter 12a, the second light emitter 12b, the third light emitter 12c, the first condenser lens 13a, the second condenser lens 13b, the third condenser lens 13c, the wavelength converter 14, a vapor chamber 215, the heat dissipating member 16, the first lens support member 18a, the second lens support member 18b, and the third lens support member 18c.

The vapor chamber 215 in the present embodiment has a substantially U-letter-like cross-sectional shape. Specifically, the vapor chamber 215 includes a first extending section 215A, which extends in the axis −X direction (first direction) and is provided with the first light emitter 12a, a second extending section 215B, which is disposed so as to face the first extending section 215A, extends in the axis −X direction, and is provided with the third light emitter 12c, and a third extending section 215C, which is coupled to one end of the first extending section 215A and one end of the second extending section 215B (ends facing side −X) and provided with the second light emitter 12b.

The circuit substrate 11E in the present embodiment includes a first section 11E1 provided at the first extending section 215A of the vapor chamber 215, a second section 11E2 provided at the second extending section 215B of the vapor chamber 215, and a third section 11E3 provided at the third extending section 215C of the vapor chamber 215.

The first opening H1 is formed in the first section 11E1, the third opening H3 is formed in the second section 11E2, and the second opening H2 is formed in the third section 11E3.

The first light emitter 12a is provided on the circuit substrate 11E (first section 11E1) exposed in the first opening H1, the second light emitter 12b is provided on the circuit substrate 11E (third section 11E3) exposed in the second opening H2, and the third light emitter 12c is provided on the circuit substrate 11E (second section 11E2) exposed in the third opening H3.

In the present embodiment, the first light emitter 12a, the second light emitter 12b, and the third light emitter 12c are so disposed that the optical axes thereof are perpendicular to one another, and the fourth dichroic mirror 26 is disposed so as to incline by the angle of 45° with respect to the optical axes of the first light emitter 12a, the second light emitter 12b, and the third light emitter 12c.

The fourth dichroic mirror 26 is optically characterized so as to reflect light having the blue wavelength band and light having the short wavelength band and transmit light having the yellow wavelength band. In the present embodiment, the fourth dichroic mirror 26 transmits the fluorescence YL from the wavelength converter 14 and reflects the blue light BL from the first light emitter 12a to cause the white light WL, which is the combination of the blue light BL and the fluorescence YL, to exit in the axis −X direction. The fourth dichroic mirror 26 further reflects the auxiliary excitation light E1 emitted from the third light emitter 12c and causes the reflected light to be incident on the wavelength converter 14.

The heat dissipating member 16 in the present embodiment is provided at the heat dissipater 5a of the first extending section 215A, the second extending section 215B, and the third extending section 215C of the vapor chamber 215.

The light source apparatus 2E according to the present embodiment, in which the vapor chamber 215 has the U-letter-like cross-sectional shape, allows reduction in the dimensions of the light source apparatus 2E in the axis −X and axis −Z directions even when three light emitters are provided. Furthermore, unlike the light source apparatus 2A according to the second embodiment, the mirror 23 and the third dichroic mirror 24 for causing the auxiliary excitation light E1 to be incident on the wavelength converter 14 can be omitted, and one of the dichroic mirrors can be omitted, whereby the number of parts can be significantly reduced.

In the present embodiment, the first light emitter 12a and the third light emitter 12c may be swapped in terms of position. In this case, the fourth dichroic mirror 26 may be rotated by 90 degrees around the axis Y.

Seventh Embodiment

The light source apparatus according to a seventh embodiment will be subsequently described. The present embodiment differs from the first embodiment in that three light emitters are provided and the vapor chamber is differently shaped. In the following description, configurations and members common to those in the first embodiment have the same reference characters and will not be described in detail.

Figure 9:
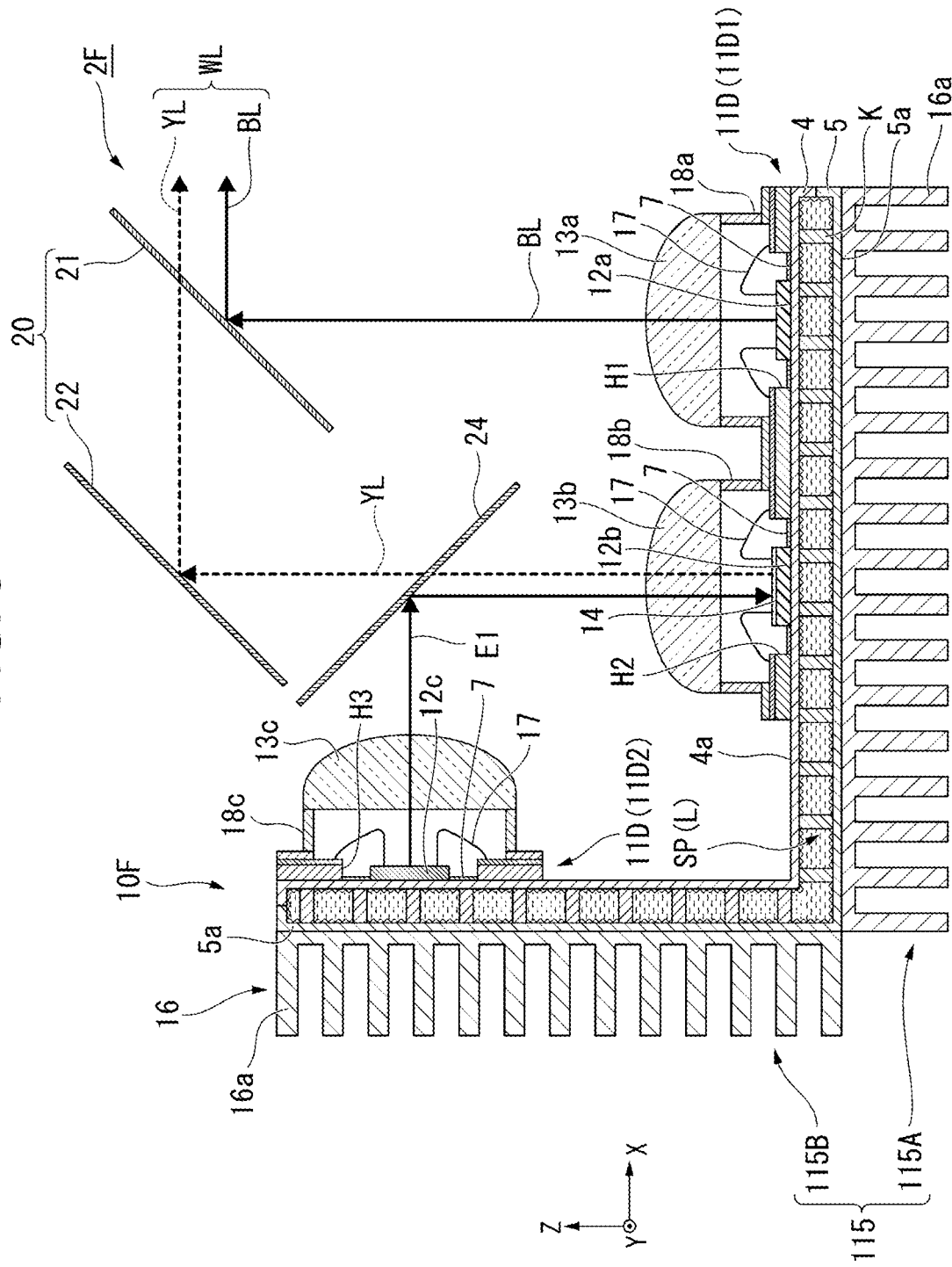
FIG. 9 is a cross-sectional view showing a schematic configuration of the light source apparatus according to a seventh embodiment.

FIG. 9 is a cross-sectional view showing a schematic configuration of a light source apparatus 2F according to the present embodiment.

The light source apparatus 2F includes a light source section 10F, the light combining system 20, and the third dichroic mirror (optical element) 24, as shown in FIG. 9. The light source apparatus 2F according to the present embodiment corresponds to a variation of the light source apparatus 2D according to the fifth embodiment.

The light source section 10F in the present embodiment includes the circuit substrate 11D, the first light emitter 12a, the second light emitter 12b, the third light emitter 12c, the first condenser lens 13a, the second condenser lens 13b, the third condenser lens 13c, the wavelength converter 14, the vapor chamber 115, the heat dissipating member 16, the first lens support member 18a, the second lens support member 18b, and the third lens support member 18c.

In the vapor chamber 115 in the present embodiment, the third light emitter 12c is provided at the second extending section 115B.

In the light source apparatus 2E according to the present embodiment, the third light emitter 12c and the third dichroic mirror 24 are arranged in the axis −X direction. The second light emitter 12b, the wavelength converter 14, the third dichroic mirror 24, and the second dichroic mirror 22 are arranged in the axis −Z direction. The first light emitter 12a and the first dichroic mirror 21 are arranged in the axis −Z direction.

The light source apparatus 2F according to the present embodiment, in which the vapor chamber 115 has the L-letter-like cross-sectional shape, allows reduction in the dimension of the light source apparatus 2F in the axis −X direction. Furthermore, since the mirror 23 for reflecting the auxiliary excitation light E1 can be omitted as compared with the configuration of the light source apparatus 2A according to the second embodiment, the number of parts can be reduced.

The embodiments according to the present disclosure have been described above, aspects of the present disclosure is not limited to the embodiments described above, and can be changed as appropriate to the extent that the changes do not depart from the intent of the present disclosure.

For example, the aforementioned embodiments have been described with reference to the case where the vapor chambers are used as the thermal diffuser, and a graphite sheet may instead be used as the thermal diffuser.

The first embodiment has been described with reference to the case where the second light emitter 12b emits excitation light having the same blue wavelength band as that of the light from the first light emitter 12a, and the second light emitter 12b may be configured to emit auxiliary excitation light having the short wavelength band different from the wavelength band of the light from the first light emitter 12a.

The second embodiment has been described with reference to the case where the third light emitter 12c emits the auxiliary excitation light E1 having a wavelength band shorter than the blue wavelength band, and the third light emitter 12c may instead emit light having the same blue wavelength band as that of the blue light BL and may cause the light to be incident on the wavelength converter 14.

In the embodiments described above, light having a wavelength band shorter than the blue wavelength band may be caused to be incident on the wavelength converter 14 as the excitation light to be incident thereon.

In the fourth embodiment, the light emitted from the fourth light emitter 12d may have the same wavelength band as those of the blue light BL and auxiliary excitation light E1 in place of the red light RL.

In the fourth embodiments, the light emitted from the third light emitter 12c may have the same wavelength band as blue light BL in place of the auxiliary excitation light BL.

A light source apparatus according to an aspect of the present disclosure may have the configuration below.

The light source apparatus according to the aspect of the present disclosure includes a circuit substrate that has a first surface and a second surface provided at the side opposite from the first surface and has a first opening passing through the first and second surfaces, a first light emitter that is electrically coupled to the circuit substrate and emits first light having a first wavelength band, and a thermal diffuser provided at the second surface of the circuit substrate, and the first light emitter is provided at the thermal diffuser exposed in the first opening.

The light source apparatus according to the aspect of the present disclosure may further include a second light emitter that is electrically coupled to the circuit substrate and emits second light having the first wavelength band or a second wavelength band different from the first wavelength band, and a wavelength converter that is disposed at a light emitting surface of the second light emitter and converts the second light into converted wavelength light having a third wavelength band different from the first and second wavelength bands. The circuit substrate may further have a second opening passing through the first and second surfaces, and the second light emitter may be provided at the thermal diffuser exposed in the second opening.

The light source apparatus may further include a third light emitter that is electrically coupled to the circuit substrate and emits third light having any of the first wavelength band, the second wavelength band, and a fourth wavelength band different from the first and second wavelength bands. The circuit substrate may further have a third opening passing through the first and second surfaces, and the third light emitter may be provided at the thermal diffuser exposed in the third opening.

The light source apparatus according to the aspect of the present disclosure may further include an optical element that reflects the third light emitted from the third light emitter and having the first or second wavelength band to cause the reflected third light to be incident on the wavelength converter and transmits the converted wavelength light outputted from the wavelength converter. The third light may enter the wavelength converter via a second incidence surface of the wavelength converter, the second incidence surface being different from a first incident surface of the wavelength converter on which the second light is incident, and the third light may be converted by the wavelength converter into the converted wavelength light.

The light source apparatus according to the aspect of the present disclosure may further include a fourth light emitter that is electrically coupled to the circuit substrate and emits fourth light having any of the first wavelength band, the second wavelength band, and the fourth wavelength band. The circuit substrate may further have a fourth opening passing through the first and second surfaces, and the fourth light emitter may be provided at the thermal diffuser exposed in the fourth opening.

In the light source apparatus according to the aspect of the present disclosure, the first light emitted by the first light emitter may be light having the first wavelength band, the second light emitted by the second light emitter may be light having the first wavelength band, the third light emitted by the third light emitter may be light having the second wavelength band, and the fourth light emitted by the fourth light emitter may be light having the fourth wavelength band.

In the light source apparatus according to the aspect of the present disclosure, the thermal diffuser may have a plurality of regions exposed in the first, second, third, and fourth openings, and at least any of the plurality of regions may be provided with a reflection film.

The light source apparatus according to the aspect of the present disclosure may further include a light combining system that combines the first light emitted from the first light emitter and the converted wavelength light outputted from the wavelength converter with each other. The thermal diffuser may include a first extending section extending in a first direction and provided with the first and second light emitters, and a second extending section extending from the first extending section in a second direction that intersects with the first direction and provided with the third light emitter. The light combining system may cause the combined light, which is the combination of at least the first light and the converted wavelength light, to exit in the first or second direction.

In the light source apparatus according to the aspect of the present disclosure, the thermal diffuser may include a first extending section extending in the first direction and provided with one of the first and third light emitters, a second extending section disposed so as to face the first extending section, extending in the first direction, and provided with the other one of the first and third light emitters, and a third extending section connected to the end, of the first extending section, in the first direction and the end, of the second extending section, in the first direction, and provided with the second light emitter, and the optical element may transmit the converted wavelength light and reflect the first light to cause the combined light, which is the combination of the first light and the converted wavelength light, to exit in the first direction.

In the light source apparatus according to the aspect of the present disclosure, the thermal diffuser may be a vapor chamber.

In the light source apparatus according to the aspect of the present disclosure, the vapor chamber may include a heat receiving plate that supports the first light emitter, a heat dissipating plate that is provided at the side, of the heat receiving plate, opposite from the first light emitter, and a plurality of coupling members that thermally couple the heat receiving plate and the heat dissipating plate to each other.

In the light source apparatus according to the aspect of the present disclosure, in the plan view of the surface, of the heat receiving plate, that supports the first light emitter, some of the plurality of coupling members may be provided at positions where these coupling members overlap with the first light emitter.

A projector according to another aspect of the present disclosure may have the configuration below.

The projector according to the other aspect of the present disclosure includes the light source apparatus according to the aspect described above, a light modulator that modulates the light from the light source apparatus in accordance with image information to form image light, and a projection optical apparatus that projects the image light.

What is claimed is:

1. A light source apparatus comprising:
   a circuit substrate that has a first surface and a second surface provided at a side opposite from the first surface and has a first opening passing through the first and second surfaces;
   a first light emitter that is electrically coupled to the circuit substrate and emits first light having a first wavelength band; and
   a thermal diffuser provided at the second surface of the circuit substrate,
   wherein the first light emitter is provided at the thermal diffuser exposed in the first opening, and the light source apparatus further comprising
   a second light emitter that is electrically coupled to the circuit substrate and emits second light having the first wavelength band or a second wavelength band different from the first wavelength band;
   a wavelength converter that is disposed at a light emitting surface of the second light emitter and converts the second light into converted wavelength light having a third wavelength band different from the first and second wavelength bands;
   a third light emitter that is electrically coupled to the circuit substrate and emits third light having any of the first wavelength band, the second wavelength band, and a fourth wavelength band different from the first and second wavelength bands; and
   an optical element that reflects the third light emitted from the third light emitter and having the first or second wavelength band to cause the reflected third light to be incident on the wavelength converter and transmits the converted wavelength light outputted from the wavelength converter, wherein
   the second light emitter is provided at the thermal diffuser exposed in the second opening,
   the circuit substrate further has a second opening passing through the first and second surfaces,
   the circuit substrate further has a third opening passing through the first and second surfaces,
   the third light emitter is provided at the thermal diffuser exposed in the third opening,
   the third light enters the wavelength converter via a second incidence surface of the wavelength converter, the second incidence surface being different from a first incident surface of the wavelength converter on which the second light is incident, and
   the third light is converted by the wavelength converter into the converted wavelength light.

2. The light source apparatus according to claim 1, further comprising a fourth light emitter that is electrically coupled to the circuit substrate and emits fourth light having one of the first wavelength band, the second wavelength band, and the fourth wavelength band,
   wherein the circuit substrate further has a fourth opening passing through the first and second surfaces, and
   the fourth light emitter is provided at the thermal diffuser exposed in the fourth opening.

3. The light source apparatus according to claim 2, wherein the first light emitted by the first light emitter is light having the first wavelength band,
   the second light emitted by the second light emitter is light having the first wavelength band,
   the third light emitted by the third light emitter is light having the second wavelength band, and
   the fourth light emitted by the fourth light emitter is light having the fourth wavelength band.

4. The light source apparatus according to claim 2, wherein the thermal diffuser has a first region exposed in the first opening,
   a second region exposed in the second opening,
   a third region exposed in the third opening,
   a fourth region exposed in the fourth opening, and
   at least one of the first, second, third, and fourth region is provided with a reflection film.

5. The light source apparatus according to claim 1, further comprising a light combining system that combines the first light emitted from the first light emitter and the converted wavelength light outputted from the wavelength converter with each other,
   wherein the thermal diffuser includes a first extending part extending in a first direction and provided with the first and second light emitters, and a second extending part extending from the first extending part in a second direction that intersects with the first direction and provided with the third light emitter, and
   the light combining system exits combined light that is a combination of at least the first light and the converted wavelength light in the first or second direction.

6. The light source apparatus according to claim 1, wherein the thermal diffuser includes a first extending section extending in the first direction and provided with one of the first and third light emitters, a second extending section disposed so as to face the first extending section, extending in the first direction, and provided with another one of the first and third light emitters, and a third extending section connected to an end, of the first extending section, in the first direction and an end, of the second extending section, in the first direction, and provided with the second light emitter, and
   the optical element transmits the converted wavelength light and reflects the first light to cause combined light that is a combination of the first light and the converted wavelength light to exit in the first direction.

7. The light source apparatus according to claim 1, wherein the thermal diffuser is a vapor chamber.

8. The light source apparatus according to claim 7, wherein the vapor chamber includes
a heat receiving plate that supports the first light emitter,
a heat dissipating plate that is provided at a side, of the heat receiving plate, opposite from the first light emitter, and
a plurality of coupling members that thermally couple the heat receiving plate and the heat dissipating plate to each other.

9. The light source apparatus according to claim 8, wherein in a plan view of a surface, of the heat receiving plate, that supports the first light emitter, some of the plurality of coupling members are provided at positions where these coupling members overlap with the first light emitter.

10. A projector comprising:
the light source apparatus according to claim 1;
a light modulator that modulates light from the light source apparatus in accordance with image information to form image light; and
a projection optical apparatus that projects the image light.

* * * * *